US009253594B2

(12) United States Patent
Lakhzouri et al.

(10) Patent No.: US 9,253,594 B2
(45) Date of Patent: Feb. 2, 2016

(54) DYNAMIC CHARACTERIZATION OF MOBILE DEVICES IN NETWORK-BASED WIRELESS POSITIONING SYSTEMS

(71) Applicant: QUALCOMM Incorporated, San Diego, CA (US)

(72) Inventors: Abdelmonaem Lakhzouri, Tampere (FI); Florean Curticapean, Tampere (FI); Sergey Guborev, Tampere (FI)

(73) Assignee: QUALCOMM Incorporated, San Diego, CA (US)

( * ) Notice: Subject to any disclaimer, the term of this patent is extended or adjusted under 35 U.S.C. 154(b) by 280 days.

(21) Appl. No.: 13/787,655

(22) Filed: Mar. 6, 2013

(65) Prior Publication Data

US 2014/0256347 A1  Sep. 11, 2014

(51) Int. Cl.
*H04W 24/00* (2009.01)
*H04W 4/02* (2009.01)
*H04W 64/00* (2009.01)
*G01S 5/02* (2010.01)

(52) U.S. Cl.
CPC ............... *H04W 4/02* (2013.01); *G01S 5/0205* (2013.01); *H04W 64/00* (2013.01); *G01S 5/0263* (2013.01); *Y02B 60/50* (2013.01)

(58) Field of Classification Search
CPC ....... H04W 64/00; H04W 4/02; H04W 4/023; H04W 64/003; H04W 4/025; H04W 84/18; H04W 4/021; H04W 24/10; H04W 84/12; H04W 24/02; H04W 52/02; H04W 56/0065; G01S 5/0252; G01S 5/14; G01S 5/10
USPC ....................................................... 455/456.1
See application file for complete search history.

(56) References Cited

U.S. PATENT DOCUMENTS

| 6,741,556 | B1 | 5/2004 | Seddigh et al. |
| 8,712,690 | B1* | 4/2014 | White et al. ................... 701/526 |
| 8,971,428 | B2 | 3/2015 | Lakhzouri et al. |
| 8,971,429 | B2 | 3/2015 | Zhang et al. |
| 2003/0054829 | A1 | 3/2003 | Moisio |
| 2007/0121560 | A1* | 5/2007 | Edge ............................. 370/338 |
| 2008/0032731 | A1 | 2/2008 | Shen et al. |
| 2009/0093219 | A1 | 4/2009 | Katada et al. |
| 2010/0202298 | A1 | 8/2010 | Agarwal et al. |

(Continued)

FOREIGN PATENT DOCUMENTS

JP      2009055347 A      3/2009

OTHER PUBLICATIONS

International Search Report and Written Opinion—PCT/US2014/015514—ISA/EPO—Jul. 24, 2014.

*Primary Examiner* — Kwasi Karikari
(74) *Attorney, Agent, or Firm* — Silicon Valley Patent Group LLP

(57) ABSTRACT

Embodiments disclosed pertain to apparatuses, systems, and methods for dynamically characterizing a mobile station (MS) in a wireless network by determining the variability of measured Round Trip Time (RTT) parameter values, the variability of measured Received Signal Strength Indicator (RSSI) parameter values and other determined characteristics and classifying the MS into at least one of a plurality of classification groups based on the values of at least one of the RTT variability, the RSSI variability, or the other determined characteristics. The classification groups associated with a mobile station may be used to selecting a positioning method to determine the position of the MS.

52 Claims, 7 Drawing Sheets

(56) References Cited

U.S. PATENT DOCUMENTS

| | | |
|---|---|---|
| 2010/0279700 A1 | 11/2010 | Kim et al. |
| 2013/0054783 A1 | 2/2013 | Ge et al. |
| 2014/0004878 A1* | 1/2014 | Park et al. .................. 455/456.1 |
| 2014/0086369 A1 | 3/2014 | Zhang et al. |
| 2014/0087751 A1 | 3/2014 | Do et al. |
| 2014/0104157 A1 | 4/2014 | Burns et al. |
| 2014/0106684 A1 | 4/2014 | Burns et al. |
| 2014/0153420 A1 | 6/2014 | Garin et al. |
| 2014/0206381 A1* | 7/2014 | Yamada et al. ............ 455/456.1 |

* cited by examiner

DYNAMIC CHARACTERIZATION OF MOBILE DEVICES IN NETWORK-BASED WIRELESS POSITIONING SYSTEMS

FIELD

The subject matter disclosed herein relates to the determination of mobile station locations.

BACKGROUND

In network based positioning ("NBP") systems, the locations of mobile stations ("MS"), which may be equipped with wireless communication capabilities such as Wi-Fi and/or a Global Navigation Satellite System ("GNSS"), can be computed based on a variety of metrics. In referring to the process of determining the location of an MS using a positioning system, the terms location estimation, geo-location, locating and positioning are often used interchangeably. Location estimation of wireless devices inside a building can be challenging. While GNSS' such as the Global Positioning System (GPS) work well in outdoor environments, GPS is often less effective within a building due to signal losses. Thus, Radio Frequency ("RF") communications capabilities of the MS are often used to determine MS locations.

In traditional NBP systems, mobile stations served by the NBP system may have a variety of Wi-Fi chipsets, which may exhibit different characteristics despite adhering to a common standard or protocol. These differences in chipset and other MS characteristics may affect the accuracy and/or reliability of measured metrics and any NBP mobile station location estimates that are based on those metrics.

Therefore, there is a need for systems and methods to maintain consistency in the quality of service, and enhance the accuracy and reliability of location estimations provided by NBP positioning systems.

SUMMARY

In some embodiments, a processor-implemented method for dynamically characterizing a mobile station (MS) in a wireless network may comprise determining at least one of a variability of measured Round Trip Time (RTT) parameter values, or a variability of measured Received Signal Strength Indicator (RSSI) parameter values; and classifying the MS into at least one of a plurality of classification groups, wherein the at least one classification group may be based on the values of at least one of the RTT variability or the RSSI variability. In some embodiments, the RTT variability and RSSI variability may be determined by the standard deviation of the RTT parameter values and the standard deviation of the RSSI parameter values, respectively; and classification group(s) of MS may be based on at least one of: the RTT standard deviation, or the RSSI standard deviation. In some embodiments, the wireless network may be a Wireless Local Area Network (WLAN) and the dynamic characterization may be performed using standard IEE 802.11 frames. In some embodiments, the method may be performed by a server coupled to the wireless network.

In some embodiments, a time bias associated with the MS may also be calculated from information pertaining to a number of antennas on the MS and/or information pertaining to a current power savings mode of the MS may be obtained. Further, the at least one classification group of the MS, and at least one of the time bias or power management mode may be provided to a positioning engine, or otherwise used, to determine a position fix of the MS. The time bias may be estimated based on the time delay between the first and last antenna transmission. The current power savings modes may comprise one of: Constantly Awake (CAM) mode, Power Save Mode (PSM), Unscheduled Automatic Power Save Delivery (U-APSD), WMM Power Save (WMM-PS), Power Save Multi-Poll (PSMP), and Dynamic MIMO Power Save.

In some embodiments, a Media Access Control (MAC) address of the MS may be obtained and stored in a record of a database coupled to the wireless network along with the classification group(s) of the MS, and at least one of: the RSSI variability, the RTT variability, the number of antennas on the MS, the time bias associated. When an MS reconnects to the wireless network at a subsequent time, the database may be queried using the MAC address of the MS to obtain information pertaining to at least one of the classification group of the MS, the time bias of the MS, power savings mode of the MS, the query occurring when the MS; and the obtained information may be provided to a positioning engine, or otherwise used to determine a position fix for the MS.

In some embodiments, a method for performing mobile station positioning operations over a wireless network may comprise: obtaining at least one of a plurality of classification groups that may be associated with a mobile station (MS), wherein the classification group(s) may be based on the values of at least one of a Round Trip Time (RTT) variability, or a Received Signal Strength Indicator (RSSI) variability associated with the mobile station; and selecting a positioning method based, in part, on the classification group(s) of the MS. In some embodiments, information about a power savings mode of the MS may be obtained and used to schedule measurement requests related to the positioning operations during MS wake periods.

In some embodiments, the selected positioning method may increase the number of RTT measurements for the MS during positioning operations, if the at least one classification group indicates that RTT variability is moderate; and/or deweight RTT measurements during computation of a position fix for the MS, if the at least one classification group indicates that RTT variability is high. Similarly, the selected positioning method may increase the number of RSSI measurements during positioning operations, if the at least one classification group indicates that RSSI variability is moderate; and deweight RSSI measurements during computation of a position fix for the MS, if the at least one classification group indicates that RSSI variability is high.

Disclosed embodiments also pertain to apparatuses, systems, and computer-readable media embodying instructions to perform the above methods.

DETAILED DESCRIPTION

The detailed description set forth below in connection with the appended drawings is intended as a description of some exemplary non-limiting embodiments and various other embodiments may be practiced and are envisaged as would be apparent to one of skill in the art. Embodiments described are provided merely as examples or illustrations of the present disclosure. The detailed description includes specific details for the purpose of providing a thorough understanding of the present disclosure. However, it will be apparent to those skilled in the art that the present disclosure may be practiced without one or more of these specific details. In some instances, well-known structures and devices are not shown in block diagram form in order to avoid obscuring the concepts of the present disclosure. Acronyms and other descriptive terminology may be used merely for convenience and clarity and are not intended to limit the scope of the disclosure.

Mobile station characterization techniques described herein may be implemented in conjunction with various wireless networks, including wireless communication networks such as a wireless local area network (WLAN), a wireless personal area network (WPAN), wireless wide area network (WWAN) and so on.

Figure 1:
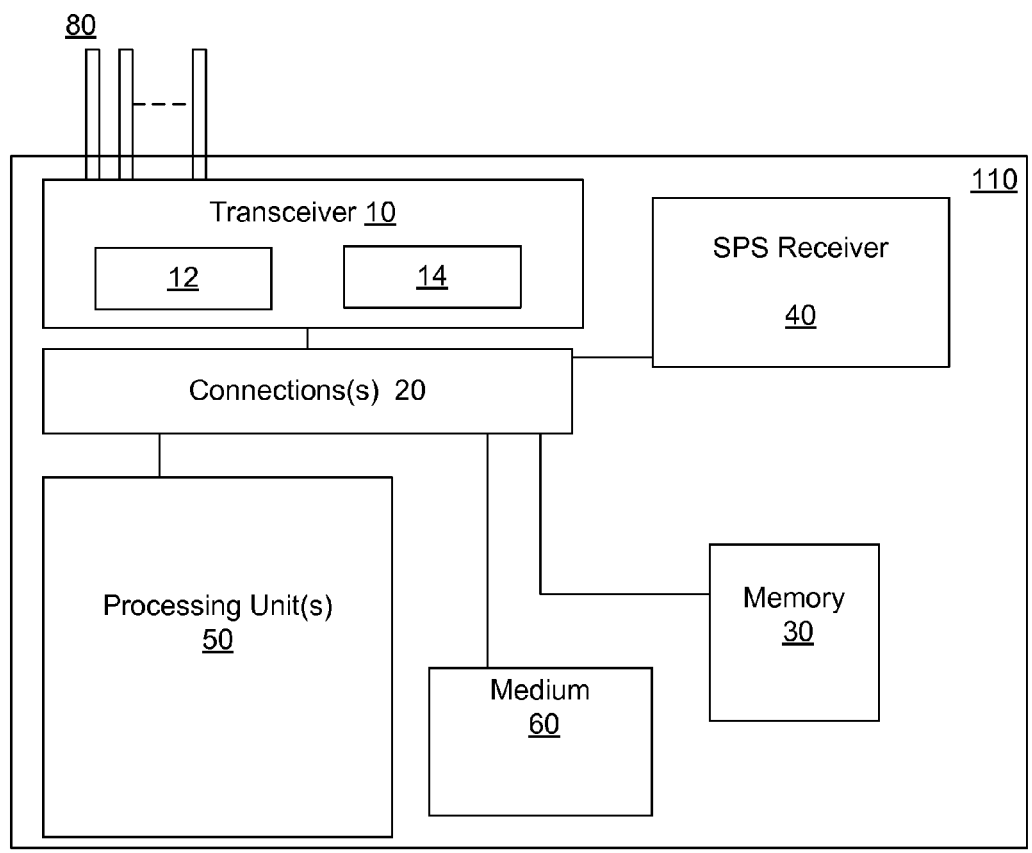
FIG. 1 shows a schematic block diagram illustrating certain exemplary features of a mobile station.

FIG. 1 shows a schematic block diagram illustrating certain exemplary features of Mobile Station (MS) 110. Mobile station 110 may be stationary or mobile and may also be referred to as a mobile terminal, a user equipment (UE), an access terminal (AT), a subscriber station, a station (STA), etc. The term "mobile station" is also intended to include devices which communicate with a personal navigation device (PND), for example by using short-range wireless, infrared, wireline connection, or other connection regardless of whether satellite signal reception, assistance data reception, and/or position-related processing occurs at the device(s) or at the PND. Also, mobile station 110 may be a cellular phone, a personal digital assistant (PDA), a handheld device, a wireless device, a laptop computer, a wireless modem, a cordless phone, a telemetry device, a tracking device, etc., which are capable of communication with a server, such as via the Internet, WiFi, or other network, and regardless of whether satellite signal reception, assistance data reception, and/or position-related processing occurs at the device, at a server, or at another device associated with the network. Any operable combination of the above are also considered a "mobile station."

Mobile station 110 may, for example, include various functional units such as one or more processing units 50, memory 30, transceiver 10 (e.g., wireless network interface), and (as applicable) an SPS receiver 40, and non-transitory computer-readable medium 60, which may comprise removable media in an exemplary removable media drive (not shown). The functional units in mobile device 110 may be operatively coupled through one or more connections 20 (e.g., buses, lines, fibers, links, etc.). In certain example implementations, all or part of mobile terminal 120 may take the form of a chipset, and/or the like.

In some embodiments, Satellite Positioning System (SPS) receiver 40, in mobile station 110, may be enabled to receive signals associated with one or more SPS resources. A satellite positioning system (SPS) typically includes a system of transmitters positioned to enable entities to determine their location on or above the Earth based, at least in part, on signals received from the transmitters. Such a transmitter typically transmits a signal marked with a repeating pseudo-random noise (PN) code of a set number of chips and may be located on ground based control stations, user equipment and/or space vehicles. In a particular example, such transmitters may be located on Earth orbiting Satellite Vehicles (SVs). As used herein an SPS may include any combination of one or more global (such as Galileo, GPS, GLONASS etc), and/or regional navigation satellite systems such as satellite systems (such as QZSS, Beidou, IRNSS etc) and/or augmentation systems. Further SPS signals may include SPS, SPS-like, and/or other signals associated with such one or more SPS.

In some embodiments, transceiver 10 may, for example, include a transmitter 12 enabled to transmit one or more signals over one or more types of wireless communication networks and a receiver 14 to receive one or more signals transmitted over the one or more types of wireless communication networks. For example, transmitter 12 and receiver 14 may be able to communicate with wireless networks including WLANs, WPANs, WWANs/cellular networks, femtocells, and various other types wireless communication networks. In some embodiments, MS 110 may also comprise one or more antennas 80, which may be internal or external. Antennas 80 may be used to transmit and/or receive signals processed by transceiver 10 and/or SPS receiver 40. In some embodiments, antennas 80 may be coupled to transceiver 10 and SPS receiver 40. In some embodiments, measurements of signals received (transmitted) by MS 110 may be performed at the point of connection of antennas 80 and transceiver 10. For example, the measurement point of reference for received (transmitted) RF signal measurements may be an input (output) terminal of the receiver 14 (transmitter 12) and an output (input) terminal of antennas 80. In systems using multiple antennas or antenna arrays 80, the antenna connector may be viewed as a virtual point representing the aggregate output (input) of multiple antennas 80.

WWANs or Cellular networks may include Code Division Multiple Access (CDMA) 1X network, a High Rate Packet Data (HRPD) network, a Wideband CDMA (WCDMA) network, a Global System for Mobile Communications (GSM) network, a General Packet Radio Service (GPRS) network, a Long Term Evolution (LTE) network, or some other wireless network. GSM, WCDMA and GPRS are part of Universal Mobile Telecommunications System (UMTS). LTE is part of Evolved Packet System (EPS). CDMA 1X and HRPD are part of cdma2000. GSM, WCDMA, GPRS and LTE are described in documents from a consortium named the "3rd Generation Partnership Project" (3GPP). CDMA 1X and HRPD are described in documents from a consortium named the "3rd Generation Partnership Project 2" (3GPP2).

WLANs may include, for example, wireless networks compatible with the Institute of Electrical and Electronics Engineers (IEEE) 802.11x family of standards, which may also be referred to as a Wi-Fi network. Such a network may also include Access Points or Wireless Access Points (APs or WAPs) that couple wireless communication devices to the WLAN. APs acts as a central transmitter and receiver of WLAN radio signals. WPANs may include Bluetooth networks, networks based on the IEEE 802.15x family of standards, or some other types of networks.

Processing unit(s) 50 may be implemented using a combination of hardware, firmware, and software. Processing unit(s) 50 may be capable of receiving instructions/data from receiver 14 and/or retrieving instructions/data from memory 30 and may respond to the instructions and/or send data/results using receiver 14. For example, the instructions received may pertain to a portion of a process to dynamically characterize MS 110. Processing unit 50 may also be capable of processing various other received information either directly or in conjunction with one or more other functional blocks shown in FIG. 1. In some embodiments, processing unit(s) 50 may represent one or more circuits configurable to perform at least a portion of a data signal computing procedure or process related to the operation of mobile terminal 110.

In some embodiments, processing unit(s) 50 may also be capable of managing power on MS 110. For example, processing unit(s) 50 may use a power management module (not shown) and/or interact with power management circuitry on MS 110 to manage power consumption by MS 110. In some embodiments, power management may place MS 110 into one of several power management modes. Processing unit(s) 50 may also be capable of dynamically adjusting data rates during communication based on channel conditions and/or signal strength. For example, processing unit(s) 50 may interact with other circuitry on MS 110-$i$ and lower data exchange rates with AP 120-$j$ to obtain robust transmission during periods of signal degradation and may dynamically increase data exchange rates when conditions improve.

Processing unit(s) 50 may be implemented using a combination of hardware, firmware, and software. Processing unit(s) 50 may represent one or more circuits configurable to perform a portion of a computing procedure or process related to mobile device characterization and may retrieve instructions and/or data from memory 30. Processing unit(s) 50 may be implemented within one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, embedded processor cores, electronic devices, other electronic units designed to perform the functions described herein, or a combination thereof. For a firmware and/or software implementation, the methodologies may be implemented with modules (e.g., procedures, functions, and so on) that perform the functions described herein.

Any machine-readable medium tangibly embodying instructions may be used in implementing the methodologies described herein. For example, software code may be stored in a non-transitory computer-readable medium 60 and/or memory 30 and may be retrieved and executed by processing unit(s) 50. A storage medium may be any available medium that can be accessed by a computer. By way of example, and not limitation, such non-transitory computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims. That is, the communication apparatus includes transmission media with signals indicative of information to perform disclosed functions.

Memory 30 may be implemented within processing unit(s) 50 and/or external to processing unit(s) 50. As used herein the term "memory" refers to any type of long term, short term, volatile, nonvolatile, or other memory and is not to be limited to any particular type of memory or number of memories, or type of physical media upon which memory is stored. In some embodiments, memory 30 may hold code to facilitate the operation of mobile device 110, and other tasks performed by processing unit(s) 50. For example, memory 30 may hold data, saved mobile device states, information about one or more modes of operation, a current configuration of MS 110, configuration history, program results, etc. In general, memory 30 may represent any data storage mechanism. Memory 30 may include, for example, a primary memory and/or a secondary memory. Primary memory may include, for example, a random access memory, read only memory, etc. While illustrated in FIG. 1 as being separate from processing unit(s) 50, it should be understood that all or part of a primary memory may be provided within or otherwise co-located and/or coupled to processing unit(s) 50.

Secondary memory may include, for example, the same or similar type of memory as primary memory and/or one or more data storage devices or systems, such as, for example, flash/USB memory drives, memory card drives, disk drives, optical disc drives, tape drives, solid state memory drives, etc. In certain implementations, secondary memory may be operatively receptive of, or otherwise configurable to couple to a non-transitory computer-readable medium 60 in a removable media drive (not shown) coupled to mobile device 110. In some embodiments, non transitory computer readable medium may form part of memory 30 and/or processing unit(s) 50.

Figure 2:
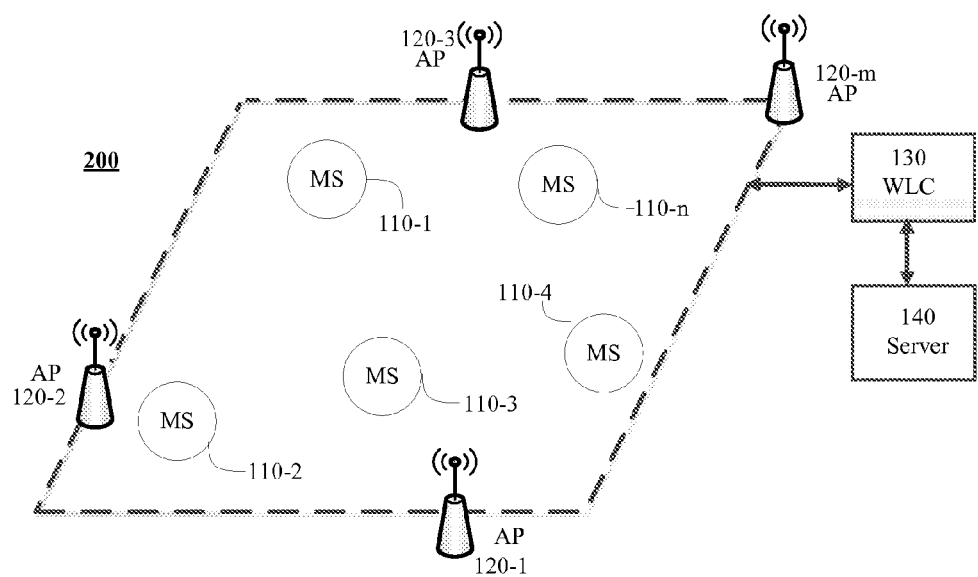
FIG. 2 shows an exemplary wireless NBP system capable of determining positions of one or more mobile stations.

FIG. 2 shows an exemplary wireless NBP system 200 capable of determining positions of one or more mobile stations 110-1-110-$n$ (collectively sometimes referred to as mobile stations 110). In some embodiments, system 200 may include server 140, Wireless LAN Controller ("WLC") 130, a network of Access Points (APs) 120-1-120-$m$ (collectively sometimes referred to as APs 120). APs 120 may be managed using WLC 130. NBP system 200 may also include Access Points or Wireless Access Points (APs or WAPs) 120 that couple wireless communication devices to the wireless network, which may take the form of a WLAN. Each AP 120 may act as a transmitter and receiver of wireless network radio signals for the WLAN or WPAN. WPANs may include Bluetooth networks, networks based on the IEEE 802.15x family of standards, or some other types of networks.

For example, a network administrator or network operations center may use WLC 130 in combination with server 140 to automatically configure APs 120 across the network. In some embodiments, WLC 130 may be used to discover, provision, and authenticate APs 120 in system 200, to set network policies and/or for network surveillance. For example, various protocols based on IEEE 802.11x family of standards such as Control and Provisioning of Access Points (CAPWAP) and/or other protocols such as Lightweight Access Point Protocol (LWAPP) may be installed on server 140 and used along with WLC 130 to control and configure multiple APs 120 in system 200. In some embodiments, programs or protocols on server 140 and/or WLC 130 may be used to manage, configure, and control APs 120. For example, WLC 130 may enforce policies related to Quality-of Service (QoS), traffic shaping and/or bandwidth management. As another example, one or more program(s) or applications on server 140 and/or WLC 130 may request and/or collect data from mobile stations 110. In general, mobile stations 110 in NBP system 200 may be of various types, brands and may operate with different configuration settings. In some embodiments, WLC 130 may include cellular network interfaces (e.g. WWAN cards) and/or wired network interfaces (e.g. Ethernet switches).

In some embodiments, for example, when using IEEE 802.11 based protocols, the Media Access Control (MAC) address of the sender and receiver, protocol version, power management mode of the sender, and other information pertaining to MS 110-$i$ may be present in and/or obtained from MS 110-$i$ ($1 \leq i \leq n$) and/or packets/frames transmitted between MS 110-$i$ and APs 120. Frame types defined in the IEEE 802.11x family of protocols include data, control and management frames. For example, in some embodiments, management or control frames may be used by APs 120 to obtain information pertaining to a current configuration of MS 110-$i$.

Each MS 110 can be uniquely identified through its Media Access Control (MAC) address. The location of MS 110-$i$ ($1 \leq i \leq n$) connected to the network may be determined upon a request from the MS 110-$i$ (MS initiated), or at the request of another network entity (network initiated), such as server 140, WLC 130, and/or AP 120-$j$ ($1 \leq j \leq m$). For example, server 140 may initiate a positioning process to determine the location of MS 110-$i$ by requesting some subset of APs 120-1 to 120-$m$ directly or indirectly to commence, undertake or report measurements of one or more metrics related to MS 110-$i$.

Typically, conventional NBP systems serve a variety of mobile stations manufactured by various vendors. Thus, mobile stations served by the NBP system may have a variety of Wi-Fi chipsets, which may exhibit different characteristics despite the fact that the served mobile stations may comply with the IEEE 802.11 or another relevant standard. In traditional NBP systems, these differences in chipset and other MS characteristics may affect the accuracy and/or reliability of the measured metrics and NBP mobile station location estimates that are based on those metrics.

The metrics measured may include, without limitation, for example, Round Trip Time ("RTT"), Received signal strength indicator ("RSSI") and channel frequency response. RTT is a measure of the round-trip time duration starting at the time a signal is transmitted to an MS 110-$i$ to the time that an acknowledgment for the transmitted signal is received from the MS 110-$i$. RSSI is a measure of the power present in a received radio signal. Typically, mobile stations 110 compliant with the IEEE 802.11 family of standards report received signal strength in the form of RSSI values. In some instances, RSSI values may be used by the WLAN and/or mobile stations 110, for example, to decide when to switch APs. In some embodiments, MS 110-$i$, Server 140, and/or another network entity may also compute the position of MS 110 through trilateration of the RTT/RSSI measurements for multiple APs 120 and/or various other appropriate algorithms.

In some embodiments, systems and methods for the dynamic characterization of mobile devices in exemplary NBP system 200 may be used, in part, to account for variations in characteristics of MS 110 thereby increasing the reliability and accuracy of location estimates for MS 110. The term dynamic characterization refers to the real time determination of MS characteristics and the classification of mobile stations into one or more classification groups based on these characteristics. For example, in some embodiments, mobile stations 110 to be located may be classified into a plurality of classification groups based on similarity in one or more behaviors and/or characteristics. For example, the variability of measured Round Trip Time (RTT) parameter values, or the variability of measured Received Signal Strength Indicator (RSSI) parameter values for a MS 110-$i$ may be determined, and MS 110-$i$ may be classified into one or more classification groups, wherein the classification group(s) may be based on the values of the RTT variability and/or the RSSI variability.

In some embodiments, algorithms, procedures and/or parameters used in the NBP positioning process for an exemplary MS 110-$i$ may be selected and/or tailored based on the classification groups of MS 110-$i$. Accordingly, exemplary NBP system 200 may be able to achieve and maintain levels of performance, accuracy and reliability in location estimates provided to a diverse set of MS 110. System and methods disclosed herein permit a reduction of the impact of individual device characteristics on the performance, accuracy and reliability of location estimates provided by NBP system 200.

Figure 3A:
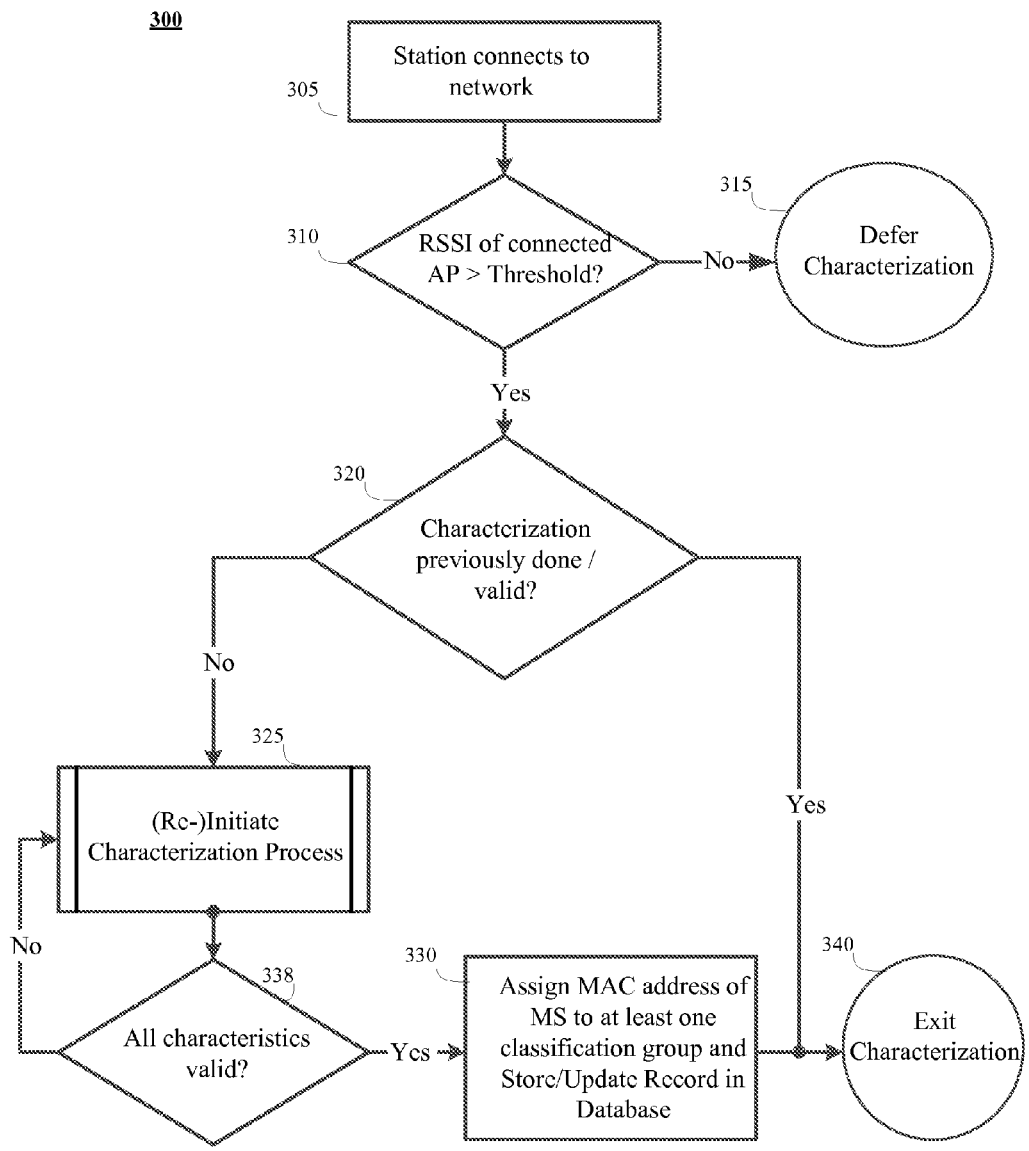
FIG. 3A shows a flowchart illustrating steps in an exemplary method for the dynamic characterization of a mobile station in an NBP system in a manner consistent with disclosed embodiments.

FIG. 3A shows a flowchart illustrating steps in an exemplary method 300 for the dynamic characterization of a mobile station in an NBP system in a manner consistent with disclosed embodiments. In some embodiments, portions of method 300 to dynamically characterize MS 110 may be implemented using program code on server 140, WLC 130, and/or another network entity in NBP system 200. For example, a dynamic characterization process running on server 140 may collect and process a set of measurements for mobile stations 110 using one or more APs 120 during dynamic characterization.

In some embodiments, the number of measurements collected by exemplary dynamic characterization method 300 during the dynamic characterization process may be higher than the number typically collected and/or used during the actual positioning of an exemplary MS 110-$i$. In some embodiments, positioning and characterization processes may be two distinct processes and the positioning process may use information collected or derived from information collected during the characterization process. In another embodiment, positioning may follow characterization and both positioning and characterization may be part of the same process.

In some embodiments, dynamic characterization method 300 may start when a mobile station, such as exemplary MS 110-$i$, initially connects to a wireless network in step 305. For example, MS 110-$i$ may listen for messages from one or more APs 120 and may connect to one of the APs 120-$j$ after an authentication process. Typically, MS 110-$i$ may attempt to connect to an AP 120-$j$ with the strongest received signal. Upon establishing a connection, the AP 120-$j$ associated with MS 110-$i$ is termed the serving AP.

Next, in step 310, the RSSI, as determined by and/or reported to serving AP 120-$j$ ($1 \leq j \leq m$) to which exemplary MS 110-$i$ is connected, is compared to a threshold RSSI level. If the RSSI level is below the threshold RSSI level ("No" in step 310), then, in step 315, the characterization of MS 110-$i$ can potentially be deferred to later point. In some embodiments, in the event that the characterization process has been deferred, the RSSI level of MS 110-$i$ may be monitored and periodically checked against the threshold RSSI level to determine if dynamic characterization method 300 for MS 110-$i$ can be restarted.

In some embodiments, dynamic characterization method 300 for exemplary MS 110-$i$ may be started and/or restarted when the RSSI of an AP with the strongest signal (which, in some instances, may be different from the currently serving AP) at MS 110-*i* is higher than the RSSI threshold level. In some embodiments, dynamic characterization method 300 for exemplary MS 110-*i* may be started and/or restarted when the RSSI of the serving AP 120-*j* is higher than the RSSI threshold level. In some embodiments, the RSSI threshold level may be selected to ensure reliable estimation of characteristics of exemplary MS 110-*i*.

In some embodiments, if the RSSI level of the AP with the strongest signal is above the threshold RSSI level ("Yes" in step 310), then, in step 320, the algorithm may check whether dynamic characterization was previously performed for exemplary MS 110-*i*. For example, an MS characterization database or other data store may hold the MAC address of MS 110-*i* and its classification group based on a prior characterization. Accordingly, a characterization database may be checked for a record or entry for the MAC address of MS 110-*i*. In some embodiments, the characterization database may be indexed by MAC address and a database record corresponding to the MAC address may include classification group(s) of the MS, and one or more of: the RSSI variability, the RTT variability, the number of antennas on the MS, the time bias, associated with the MS, and/or the power savings mode of the MS.

Accordingly, if the MS 110-*i* is reconnecting to the network (i.e. MS 110-*i* has previously connected to the network) the characterization database may be queried with the MAC address of the MS to obtain information pertaining to at least one of the classification group of the MS, RTT or RSSI variability, the time bias of the MS, power savings mode of the MS. If a characterization record or entry corresponding to the MAC address of MS 110-*i* exists in the characterization database and is valid ("Yes" in step 320), the algorithm may proceed to step 340, where characterization of exemplary MS 110-*i* may be terminated. In general, characteristics of MS 110 can be stored in memory (for example, if MS characteristics are to be re-used during one session) and/or on disk (for example, if MS characteristics are to be re-used across multiple sessions).

In some embodiments, the characterization of exemplary MS 110-*i* may be associated with a validity condition such as a validity period. Accordingly, if the conditions for validity of the characterization entry for MS 110-*i* are no longer true, (e.g. the validity period has expired) then the characterization of exemplary MS 110-*i* may be considered invalid. Since the characteristics of MS 110 may depend on firmware, driver, other software, and/or operating system versions, the use of a validity period and/or other validity conditions may ensure that the characterizations of MS 110 are updated at appropriate intervals.

If a characterization database record corresponding to the MAC address of MS 110-*i* does not exist, or if one or more entries associated with the characterization record is invalid, the algorithm may proceed to routine or module 325, where characterization of exemplary MS 110-*i* may be initiated. In module 325, characterization may start by measurement and analysis of one or more parameters using standard 802.11 frame exchanges between APs 112 and MS 110-*i*. In some embodiments, the characterization is a function of various parameters affecting positioning performance. For example, the parameters may include (without limitation) RTT Consistency, RSSI Consistency, Cyclic Shift Diversity Usage and Power Save Dynamics. Characterization of MS 110-*i* based on these parameters is described further below.

In step 338, the algorithm may check if all characteristics determined through characterization process 325 are valid. If the determined characteristics are valid ("Y" in step 338), then in step, 330, the MAC address of MS 110-*i* may be assigned to at least one of several classification groups. In some embodiments, the validity may be determined based on the number of received measurements. If an adequate number of measurements is received when the RSSI of the connected AP exceeds the threshold, then the characterization may be considered valid.

In some embodiments, the assignment of an MS to a classification group may be based on the variability of measured parameters or characteristics. For example, the variance, standard deviation or another statistical measure of variability associated with one or more measured parameters or characteristics may be used to assign MS to one or more classification groups. As an example, mobile stations 110 may be classified into several groups based on the variability of measured RTT parameter values. In one implementation, an MS may be assigned to one of three RTT classification groups, invariant, consistent, or inconsistent based on the variability of measured RTT values associated with the MS. Mobile stations may also be grouped, in addition, based on the variability of measured values of various other characteristics such as RSSI, and/or the variability of parameters derived from the measured characteristics. For example, an MS may exhibit invariant or very consistent measured RTT values but may exhibit inconsistency in the measurement of another parameter. Accordingly, an MS may be assigned to one classification group based on the variability of a first measured characteristic (such as RTT) and to another classification group based on the variability of a second characteristic (such as RSSI).

In some embodiments, a record associated with the MAC address of MS 110-*i* may be stored/updated with the classification group(s) of the MS, and one or more of: the RSSI variability, the RTT variability, the number of antennas on the MS, the time bias associated with the MS, or the power savings mode of the MS, in step 330.

If the determined characteristics are not valid ("N" in step 338), then, the algorithm returns to step 325 to repeat the characterization process. In step 340, after the MS has been assigned to at least one classification group, the algorithm may exit the characterization process. In some embodiments, characteristics may be deemed invalid, for example, when the RSSI of the connected AP is higher than the threshold but the number of received measurements is low, which may occur due to communication and/or network related problems including network load, power save mechanism use, etc. In some embodiments, if the number of measurements received during characterization (in step 325) is lower than some desired or predetermined number then, in step 338, characteristics may be considered as invalid.

Figure 3B:
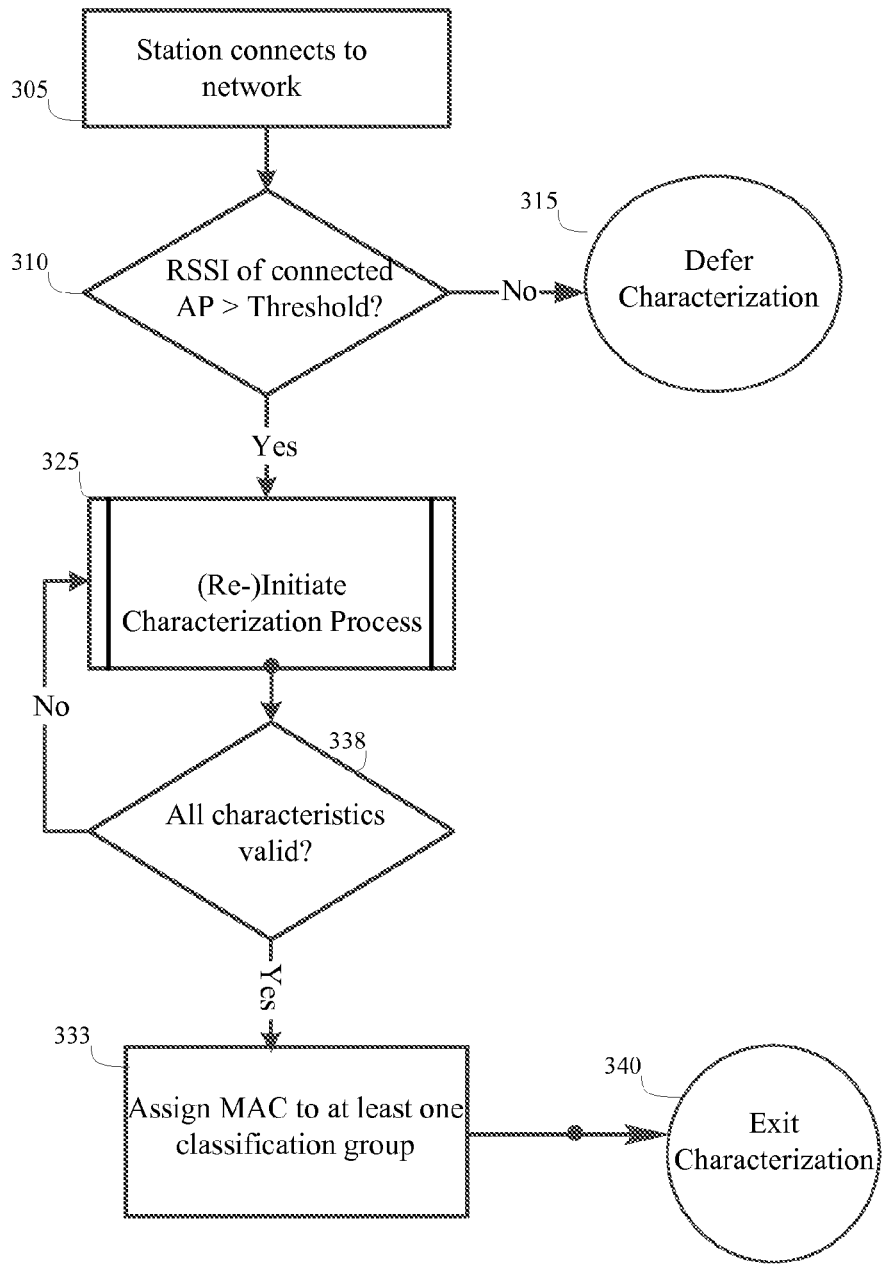
FIG. 3B shows a flowchart illustrating steps in an exemplary method for the dynamic characterization of a mobile station in an NBP system in a manner consistent with disclosed embodiments.

FIG. 3B shows a flowchart illustrating steps in an exemplary method 350 for the dynamic characterization of a mobile station in an NBP system in a manner consistent with disclosed embodiments. In some embodiments, method 350 may be performed in instances where because of privacy, security, or other concerns/policies, and/or because of physical constraints such as storage limitations, MS characteristics are not stored. Steps labeled with the same identifiers perform the same function in methods 300 and 350.

In some embodiments, dynamic characterization method 350 may start when a mobile station initially connects to a wireless network in step 305. Next, in step 310, the RSSI, as determined by and/or reported to serving AP 120-*j* ($1 \leq j \leq m$) to which exemplary MS 110-*i* is connected, is compared to a threshold RSSI level. If the RSSI level is below the threshold RSSI level ("No" in step 310), then, in step 315, the characterization of MS 110-*i* can potentially be deferred to later point. In some embodiments, if the RSSI level of the AP with the strongest signal is above the threshold RSSI level ("Yes" in step 310), then, characterization routine or module 325 may be invoked.

In some networks, privacy concerns, network or MS policies, laws, or storage limitations may limit or prevent storage of MAC addresses and/or characteristics of MS 110. For example, privacy settings on MS 110-*i* may request that the MAC address not be stored by NBP system 200. Accordingly, in networks where the positioning framework does not permit the archival of MAC addresses and/or characteristics of MS 110, dynamic characterization method 350 may be performed if characteristics of exemplary MS 110-*i* are not in memory, or whenever an exemplary MS 110-*i* connects or reconnects to the network.

In step 338, the algorithm may check if all characteristics determined through characterization process 325 are valid. If the determined characteristics are valid ("Y" in step 338), then in step, 333, the MAC address of MS 110-*i* may be assigned to at least one of several classification groups. In some embodiments, the validity of the characterization may be determined in step 338 based on the number of received measurements. If an adequate number of measurements is received when the RSSI of the connected AP exceeds the threshold, then the characterization may be considered valid. If the determined characteristics are not valid ("N" in step 338), then, the algorithm returns to step 325 to repeat the characterization process. In some embodiments, characteristics may be deemed invalid in step 338, for example, when the RSSI of the connected AP is higher than the threshold but the number of received measurements is low. In step 340, after the MS has been assigned to at least one classification group, the algorithm may exit the characterization process.

In some embodiments, in method 355, a characterization record for MS 110-*i* may be provided to a positioning engine and/or may be stored temporarily until it is used by the positioning engine before being deleted. In some embodiments, positioning may follow the characterization process.

Figure 3C:
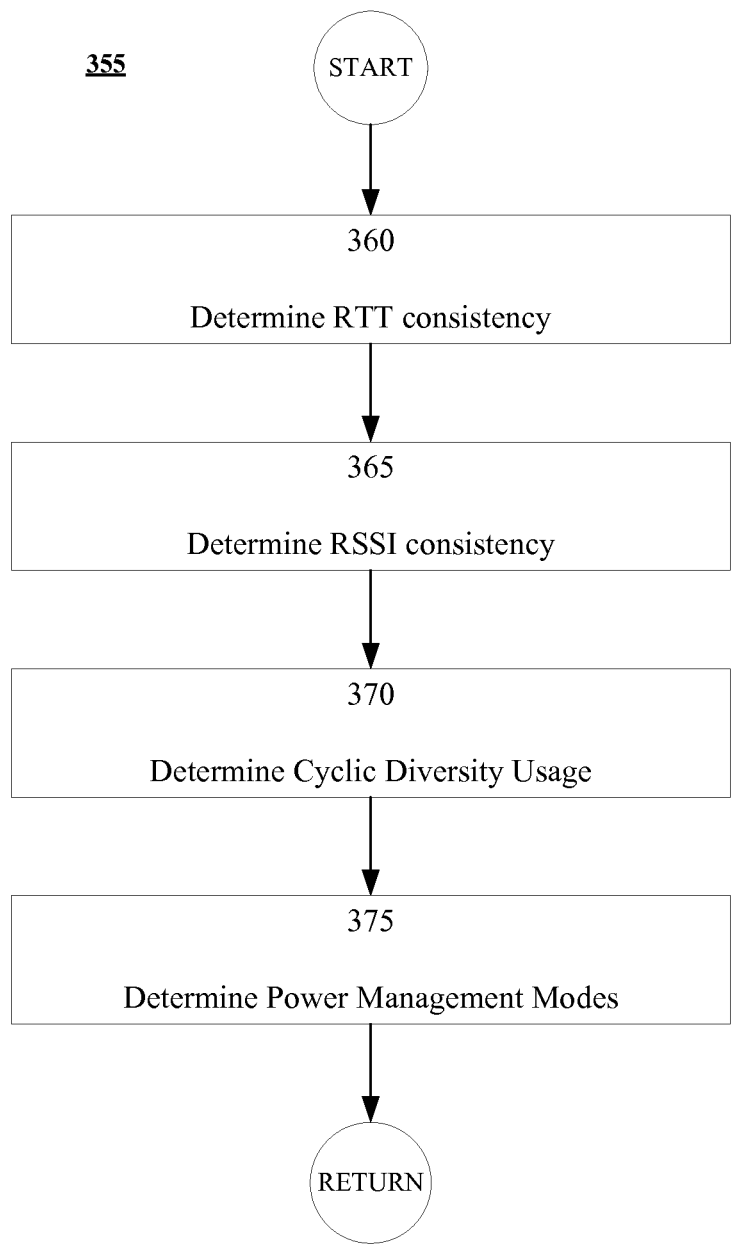
FIG. 3C shows an exemplary flowchart for a method for dynamic determination of mobile station characteristics.

FIG. 3C shows an exemplary flowchart for a method for dynamic determination of mobile station characteristics. In some embodiments, the method may be invoked as a routine or module performed as part of Initiate Characterization Process 325.

In step 360, the RTT consistency may be determined. RTT consistency refers to the degree to which the measured RTT value between MS 110-*i* and AP 120-*j* varies during the period when measurements are taken. In some embodiments, RTT measurements may be taken when MS 110-*i* is stationary. In general, because a large number of measurements may be taken in a relatively short period of time, MS 110-*i* may be assumed to be essentially stationary during the measurement period.

In some embodiments, each measured RTT value may be computed as the difference between time of Arrival (ToA) and time of Departure (ToD) of an appropriate frame. The measured RTT value is twice the propagation time between an AP 112-*j* and MS 110-*i*, and includes, additionally, the following delays:
  (i) RF front end delay of TX and RX chains
  (ii) Digital baseband processing and MAC latency
  (iii) SIFS (Short Inter-frame Space as mandated by the 802.11 standard).
The sum of delays (i)-(iii) above is termed the Turn-around Calibration Factor ("TCF"). By estimating and removing the above delays in the measured RTT, the actual propagation time and range between AP 112-*j* and MS 110-*i* can be computed.

TCF may be considered a WLAN chipset characteristic. Although, TCF is supposed to be invariant over time, this is not generally true in practice. Thus, for example, mobile stations 110 may exhibit: consistent TCFs (for example, where TCF variability may be in the order of some tens of nanoseconds), devices with medium consistent TCFs (e.g. with TCF variability in the order of few hundreds of nanoseconds) and inconsistent TCFs (e.g. with TCF variability in the order of many hundreds of nanoseconds). Note that the values of TCF variability above for categorization purposes are exemplary only and solely for descriptive purposes. In practice, the number of classification groups and associated orders of TCF variability used may differ from the exemplary values discussed above as would be apparent to one of skill in the art.

For devices with medium consistent TCFs, a reliable estimate of the true range may be obtained by increasing the number of RTT measurement samples per position fix to improve reliability. For inconsistent TCF devices, RTT measurements are not reliable, so they can either be deweighted or excluded (given zero weight) in the final position computation depending on the degree of inconsistency.

In some embodiments, the RTT variability and/or RSSI variability may be determined by the standard deviation of the RTT or RSSI parameter values and the classification groups assigned to exemplary MS 110-*i* (in steps 330 or 333) may be based on standard deviations of the RTT or RSSI parameter values.

In step 365, RSSI consistency for an MS may be determined. RSSI consistency refers to the degree to which the measured RSSI value between MS 110-*i* and AP 120-*j* varies during the period when measurements are taken. In some embodiments, RSSI measurements may be taken when MS 110-*i* is stationary. Because of the number of measurements that may be taken in a relatively short period of time, MS 110-*i* may be assumed to be essentially stationary during the measurement period.

Transmission power (Tx gain) is a MS WLAN chipset characteristic that affects the estimation of RSSI measurements. In situations, where there is an absence of multipath and/or in Line Of Sight ("LOS") conditions, the variability of RSSI measurements is small and the WLAN chipset may be considered to have consistent Tx gain. In some instances, the number of RSSI measurements per position fix may be increased to improve the accuracy of path loss estimates. For mobile stations with inconsistent Tx gain, RSSI measurements are not considered reliable, so they can be either deweighted or excluded (given zero weight) during final position computation of exemplary MS 110-*i*.

In step 370, usage of cyclic shift diversity by an MS may be determined. When an MS transmits with multiple antennas, the MS may apply a cyclic shift diversity technique, where each antenna can transmit the same signal shifted by a delay δt, which depends on the number of antennas used. At the AP side, the computed RTT will have a time bias equal to the time delay between first and last antenna transmission.

During the dynamic characterization process, in step 370, the number of antennas on exemplary MS 110-*i* may be determined. Information pertaining to the number of antennas (determined during characterization) and/or the time bias may be used during the MS positioning process to correct measured RTT and compute correct ranges between MS 110-*i* and AP 112-*j*.

In step 375, power management or power savings modes currently used by an MS may be determined. The IEEE802.11 standard describes various power management/savings modes including the seven power management modes shown in Table 1. Thus, in exemplary NBP system 200, APs 120 may interact with mobile stations 110 with differing power management mechanisms.

In some embodiments, exemplary serving AP 112-$j$ (the AP to which MS 110-$i$ is currently connected) can precisely determine the power management/savings mechanism adopted by MS 110-$i$. For example, serving AP 112-$j$ may query MS 110-$i$ about the power management or power saving mode used using the appropriate protocol. For example, standard IEEE 802.11 frames may be used to obtain information about power management/savings modes from MS 110-$i$. In step 375, dynamic characterization method 355 may determine the power save mode adopted by MS 110-$i$. In a power management or power saving mode, MS 110-$i$ may sleep and respond upon waking after some time interval. Accordingly, accurate measurements may depend proper scheduling of measurement requests based on the power management mode employed by MS 110-$i$, so that measurement may be undertaken when MS 110-$i$ is awake.

For example, power management mode characterization of MS 110-$i$, in step 375, may be used by the positioning engine to properly schedule measurement requests so that MS 110-$i$ is awake when the measurements are performed. In some embodiments, server 140 may also distribute the optimal measurement procedure type for MS 110-$i$ to other APs 120.

TABLE 1

| Power Management/ Savings Mode | Description |
| --- | --- |
| Constantly Awake (CAM) | MS power-saving features disabled |
| Power Save Mode (PSM) | MS suspends radio activity after a variable but vendor pre-determined period of inactivity. Wakes up periodically to see if there is any traffic queued. |
| Unscheduled Automatic Power Save Delivery (U-APSD) | An asynchronous approach, which allows the MS to request queued traffic at any time rather than waiting for the next beacon frame. |
| WMM Power Save (WMM-PS) | Based on Unscheduled - Automatic Power Save Delivery (U-APSD). A Scheduled (synchronous) version (S-APSD) is also defined. |
| Power Save Multi-Poll (PSMP) | Part of 802.11n |
| Dynamic MIMO Power Save. | Allows MIMO-based (802.11n) radios to downshift to a less aggressive configuration. |
| Wake on Wireless | Similar to wake-on-LAN standard allows MS to be woken up a wireless message. |

Note that the order of steps in method 355 is exemplary and may be varied. Further, one or more steps may be omitted. In some embodiments, a database record or entry associated with MS 110-$i$ in a characterization database may indicate that MS 110-$i$ uses a single antenna. Accordingly, step 370 may be omitted for the MS 110-$i$.

Figure 4:
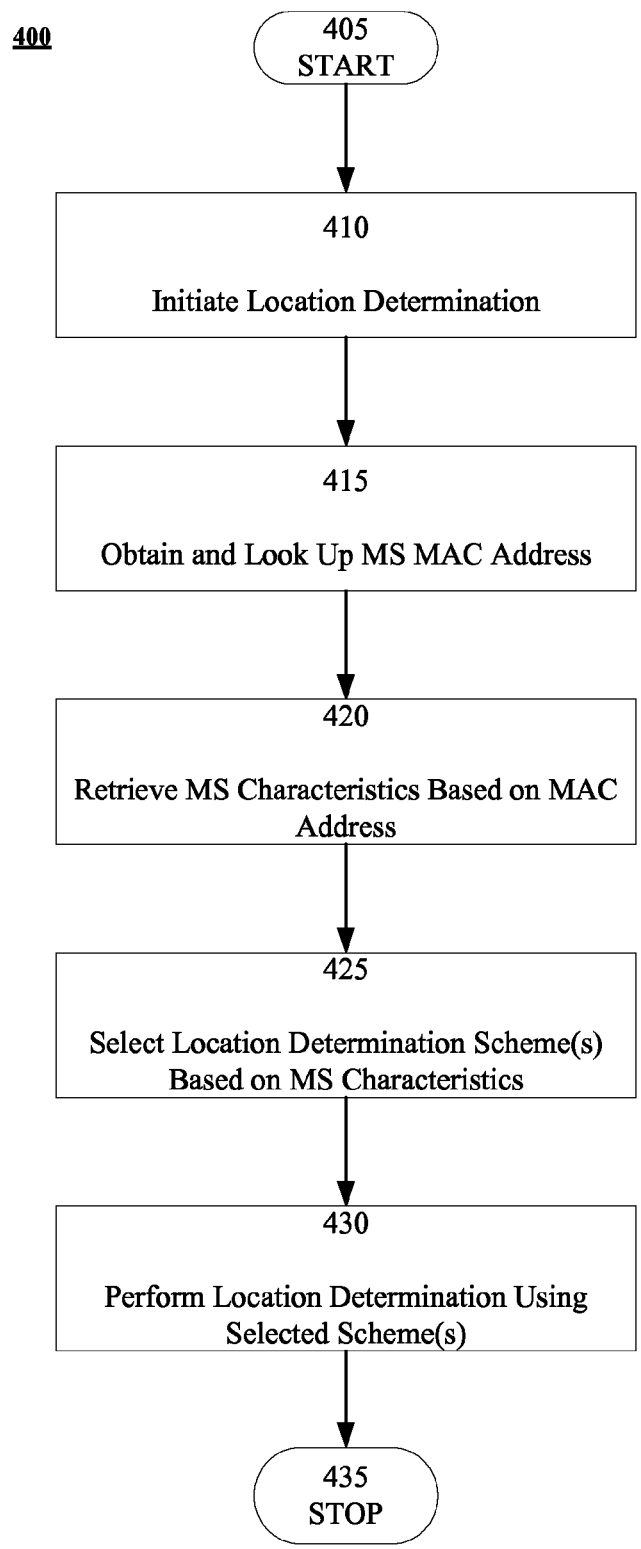
FIG. 4 shows a flowchart of an exemplary method for location determination in a manner consistent with disclosed embodiments.

FIG. 4 shows a flowchart of an exemplary method 400 for location determination in a manner consistent with disclosed embodiments. In step 410, a location determination or positioning process to determine the location of a mobile station, such as exemplary MS 110-$i$ may be initiated. In some embodiments, the location determination process may be initiated when MS 110 connects/re-connects to a wireless network and/or following dynamic characterization methods 300 and/or 350. The location determination process may be mobile-initiated, server initiated, or initiated by another network entity and may start in step 405. Next, in step 415, the MAC address of MS 110-$i$ may be obtained and looked up in a characterization database.

In step 420, a characterization record for MS 110-$i$ may be retrieved using the MAC address of MS 110-$i$. In some embodiments, the characterization record may list a set of classification groups to which MS 110-$i$ has been assigned, where each classification group is associated with a distinct parameter. For example, a characterization record for an MS 110-$i$ may indicate that measured RTT times are invariant/very consistent; that RSSI measurements are inconsistent; that MS 110-$i$ uses two antennas; and that MS 110-$i$ is constantly awake. In some embodiments, the characterization record for an MS may comprise an ordered tuple, where each value in the tuple represents a parameter-group combination associated with MS 110-$i$.

In step 425, one or more location determination schemes or positioning methods may be selected based on the characteristics associated with MS 110-$i$. For example, if a characterization record for MS 110-$i$ indicates very consistent RTT times, inconsistent RSSI measurements, use of two antennas, and usage of a "Wake on Wireless" power savings mode, then method 400 may select or tailor scheme(s) for location determination based on these characteristics. Accordingly, based on the above characteristics of MS 110-$i$, method 400 may select to use RTT measurements, account or correct for time bias based on the usage of two antennas by MS 110-$i$, and may cause a "Wake on Wireless" message to be sent to MS 110-$i$ prior to scheduling measurements.

In step 430, location determination may be performed to establish the position of MS 110-$i$ using the selected positioning method(s)/scheme(s) and the process may exit in step 435. For example, in the example above, after sending a "Wake on Wireless" message, RTT measurements may be undertaken when MS 110-$i$ is awake, the measurements may be corrected for time bias and the position of MS 110-$i$ may be established using trilateration or other well-known techniques.

In some embodiments, methods 300, 350, and 400 may be performed concurrently on several MS 110. For example, at a given time MS 110-1 and MS 110-3 may be undergoing location determination based on stored and/or recently completed dynamic characterizations, while MS 110-2, 110-4 and 110-5 may be undergoing dynamic characterization using method 300, while MS 110-7 and 110-8 may be undergoing dynamic characterization using method 350 (for example, because of MS privacy settings on MS 110-7 and 110-8). The methods may be performed by server 140 and/or another network entity. Further, although the description refers to the IEEE 802.11x family of protocols in examples, the methods disclosed are not limited in that regard and may be adapted and applied to various other protocols and wireless networks.

Further, in some embodiments, methods 300, 350, 400 may also be adapted for use in 802.11 ad-hoc mode. In ad-hoc mode, mobile units transmit directly peer-to-peer (P2P) using an independent basic service set (IBSS) network configuration. In ad-hoc networks, each mobile station can potentially act a server for other MS 110 clients. Accordingly, in ad-hoc networks, one or more of methods 300, 350, and/or 400 may be adapted and executed by an MS 110-$i$, which acts as a server to other mobile stations in an NBP system in order to dynamically characterize client mobile stations.

Figure 5:
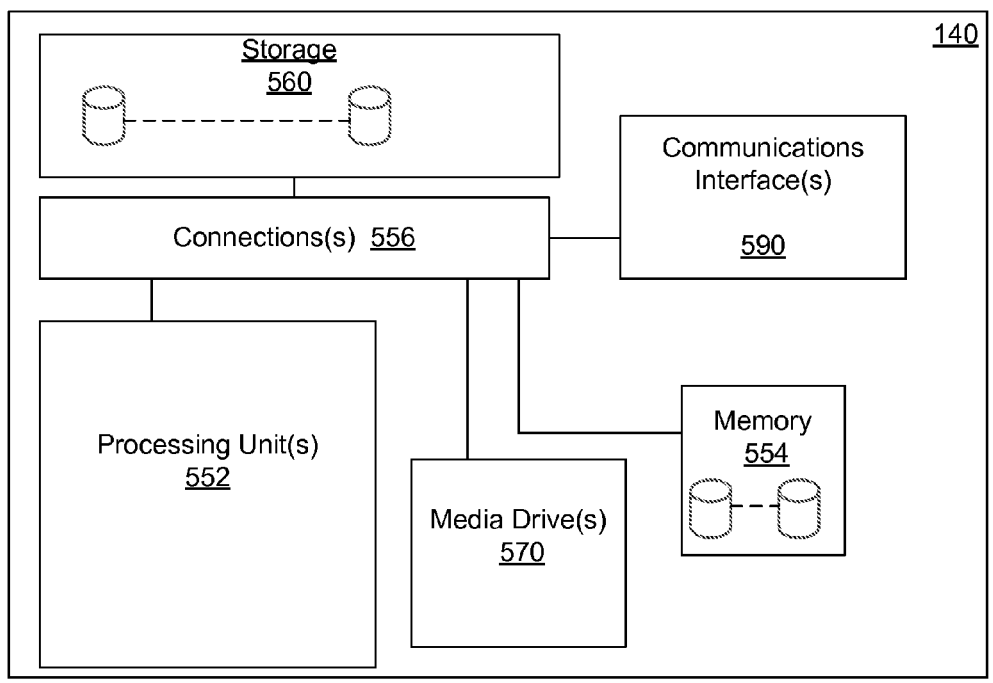
FIG. 5 shows a schematic block diagram illustrating exemplary features of a server enabled to perform dynamic characterization and/or location determination of mobile stations in a manner consistent with disclosed embodiments.

FIG. 5 shows a schematic block diagram illustrating exemplary server 140 enabled to perform dynamic characterization and/or location determination of mobile stations in a manner consistent with disclosed embodiments. In some embodiments, server 140 may include, for example, one or more processing units 552, memory 554, storage 560, and (as applicable) communications interfaces 590 (e.g., wireline and/or wireless network interfaces). The functional units listed above as well as other functional units may be operatively coupled with one or more connections 556 (e.g., buses, lines, fibers, links, etc.). In certain example implementations, some portion of server 150 may take the form of a chipset, and/or the like.

Communications interfaces 590 may include a variety of wired and/or wireless connections that support wired transmission and/or reception and, if desired, may additionally or alternatively support transmission and reception of one or more signals over one or more types of wireless communication networks. Communications interfaces 590 may also include interfaces for communication with various other computers and peripherals. For example, in one embodiment, Communications interfaces 590 may comprise network interface cards, input-output cards, chips and/or ASICs that implement one or more of the communication functions performed by server 150. In some embodiments, communications interface(s) 590 may also interface with WLC 130 or another network entity to obtain a variety of network configuration related information, such as connected devices, device configuration information, MAC addresses of connected devices, values of measured parameters, power savings mode, number of antennas, etc. In some embodiments, server 140 may also use communications interfaces 590 to direct WLC to configure APs 120 to undertake one or more measurements related to MS 110, or to enforce network policies. Further, server 140 may receive MS related information including values of measured parameters from WLC 130 through communications interfaces 590. In general, communications interfaces 590 may be used to send and receive data, control, management, and configuration information related to NBP system 200 to various network entities.

Processing unit(s) 552 may be implemented using a combination of hardware, firmware, and software. In some embodiments, processing unit 552 may include a dynamic characterization module, location determination module and/or a location assistance module (not shown) to facilitate dynamic characterization of MS 110, determine the location of MS 110, and/or to provide location assistance information, respectively. For example, if location determination is being performed by another network entity, server 140 may provide dynamic characterization information including cyclic shift diversity usage information and/or power management or savings mode information pertaining to an MS 110-*i* as location assistance information. In one embodiment, server 140 may use dynamic characterization module to implement methods 300 and/or 350, while location determination module may implement method 400. In some embodiments, the functionality in exemplary methods 300, 350 and 400 may be combined in to a single module. Processing unit 552 may also be capable of processing various other types of network related and dynamic characterization related information either directly or in conjunction with one or more other functional blocks shown in FIG. 5. In some embodiments, processing unit(s) 552 may represent one or more circuits configurable to perform at least a portion of a data signal computing procedure or process related to the operation of server 140.

The methodologies described herein in flow charts and message flows may be implemented by various means depending upon the application. For example, these methodologies may be implemented in hardware, firmware, software, or any combination thereof. For a hardware implementation, the processing unit 552 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software may be stored in media drive 570, which may support the use of non-transitory computer-readable media, including removable media. Program code may be resident on non-transitory computer readable media or memory 554 and may be read and executed by processor unit(s) 552. Memory may be implemented within processing units 552 or external to processing units 552. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a non-transitory computer-readable medium and/or memory 554. Examples include computer-readable media encoded with a data structure and computer-readable media encoded with a computer program. For example, non-transitory computer-readable medium including program code stored thereon may include program code to support dynamic characterization, location determination and/or location assistance of MS 110 in a manner consistent with disclosed embodiments.

Non-transitory computer-readable media includes a variety of physical computer storage media. A storage medium may be any available medium that can be accessed by a computer. By way of example, and not limitation, such non-transitory computer-readable media can comprise RAM, ROM, EEPROM, CD-ROM or other optical disc storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Other embodiments of non-transitory computer readable media include flash drives, USB drives, solid state drives, memory cards, etc. Combinations of the above should also be included within the scope of computer-readable media.

In addition to storage on computer readable medium, instructions and/or data may be provided as signals on transmission media to communications interfaces 590, which may store the instructions/data in memory 554, storage 560 and/or relay the instructions/data to processing units 552 for execution. For example, communications interfaces 590 may receive wireless or network signals indicative of instructions and data. The instructions and data may cause one or more processing units 552 to be configured to implement one or more functions outlined in the claims. That is, the communication apparatus includes transmission media with signals indicative of information to perform disclosed functions.

Memory 554 may represent any data storage mechanism. Memory 554 may include, for example, a primary memory and/or a secondary memory. Primary memory may include, for example, a random access memory, read only memory, nonvolatile RAM, etc. While illustrated in this example as being separate from processing units 552, it should be understood that all or part of a primary memory may be provided within or otherwise co-located/coupled with processing units 552. Secondary memory may include, for example, the same or similar type of memory as primary memory and/or storage 560 such as one or more data storage devices or systems 560 including, for example, hard disk drives, optical disc drives, tape drives, a solid state memory drive, etc. In some embodiments, storage 560 and/or memory 554 may comprise one or more databases that may hold information pertaining to various entities in NBP system 200. For example, storage 560 and/or memory 554 may include databases such as dynamic characterization databases with records for mobile stations that have connected to one or more APs 120 in NBP system 200. In some embodiments, the dynamic characterization databases may identify MS 110 by their MAC addresses and hold a dynamic characterization record for each MAC address. A dynamic characterization record for an MS 110-*i* may comprise the MAC address of MS 110-*i* and the classification group of MS 110-*i*, and one or more of: the RSSI variability, the RTT variability, the number of antennas on MS 110-*i*, the time bias associated with the MS, or the power savings mode of MS 110-*i*. In some embodiments, information in the databases may be read, used and/or updated by processing units 552 during various computations, including storing dynamic characterizations of mobile stations 110, generating location assistance data, and/or computing locations of mobile stations 110, etc.

In certain implementations, secondary memory may be operatively receptive of, or otherwise configurable to couple to a non-transitory computer-readable medium in media drive 570. As such, in certain example implementations, the methods and/or apparatuses presented herein may take the form in whole or part of a media drive 570 that may include non-transitory computer readable medium with computer implementable instructions stored thereon, which if executed by at least one processing unit 352 may be operatively enabled to perform all or portions of the example operations as described herein.

Although the present invention is illustrated in connection with specific embodiments for instructional purposes, the present invention is not limited thereto. Various adaptations and modifications may be made without departing from the scope of the invention. Therefore, the spirit and scope of the appended claims should not be limited to the foregoing description.

What is claimed is:

1. A processor-implemented method for dynamically characterizing a mobile station (MS) in a wireless network, the method comprising:
    determining at least one of: a Round Trip Time (RTT) variability of measured RTT parameter values associated with the MS, or a Received Signal Strength Indicator (RSSI) variability of measured RSSI parameter values associated with the MS; and
    classifying the MS into at least one classification group of a plurality of classification groups, wherein the at least one classification group is based on at least one of the RTT variability or the RSSI variability.

2. The processor-implemented method of claim 1, further comprising:
    calculating a time bias associated with the MS from information pertaining to a number of antennas on the MS; or
    obtaining information pertaining to a current power savings mode of the MS.

3. The processor-implemented method of claim 2, further comprising:
    providing the at least one classification group of the MS, and at least one of: the time bias or the current power savings mode to a positioning engine to determine a position fix of the MS.

4. The processor implemented method of claim 2, further comprising:
    obtaining a Media Access Control (MAC) address of the MS; and
    storing the MAC address of the MS, the at least one classification group of the MS, and at least one of: the RSSI variability, the RTT variability, the number of antennas on the MS, the time bias associated with the MS, or the current power savings mode of the MS in a record of a database coupled to the wireless network.

5. The processor-implemented method of claim 1, wherein:
    the RTT variability and RSSI variability are determined by a RTT standard deviation based on the RTT parameter values and a RSSI standard deviation based on the RSSI parameter values, respectively; and
    the at least one classification group of MS is based, in part, on at least one of: the RTT standard deviation, or the RSSI standard deviation.

6. The processor-implemented method of claim 2, wherein the time bias is a delay between the first and last antenna transmission.

7. The processor implemented method of claim 4, further comprising:
    querying the database with the MAC address of the MS to obtain information pertaining to at least one of: the at least one classification group of the MS, the time bias of the MS, a stored power savings mode of the MS, wherein the query occurs when the MS reconnects to the wireless network at a subsequent time; and
    providing the information obtained in response to the query to a positioning engine to determine a position fix for the MS.

8. The processor implemented method of claim 2, wherein the wireless network is a Wireless Local Area Network (WLAN) and the dynamic characterization is performed using standard IEE 802.11 frames.

9. The processor-implemented method of claim 2, wherein the current power savings mode comprises one of: Constantly Awake (CAM) mode, Power Save Mode (PSM), Unscheduled Automatic Power Save Delivery (U-APSD), WMM Power Save (WMM-PS), Power Save Multi-Poll (PSMP), or Dynamic MIMO Power Save.

10. The processor implemented method of claim 1, wherein the method is performed by a server coupled to the wireless network.

11. A processor implemented method for performing mobile station positioning operations over a wireless network, the method comprising:
    obtaining at least one classification group associated with a mobile station (MS), wherein the at least one classification group is based on of at least one of a value of a Round Trip Time (RTT) variability associated with the MS, or a value of a Received Signal Strength Indicator (RSSI) variability associated with the MS; and
    selecting a positioning method based, in part, on the at least one classification group of the MS.

12. The processor-implemented method of claim 11, further comprising obtaining information about a current power savings mode of the MS to schedule measurement requests related to the positioning operations during MS wake periods.

13. The processor-implemented method of claim 11, wherein the selected positioning method:
   increases a number of RTT measurements for the MS during positioning operations, if the at least one classification group indicates that the RTT variability is moderate; and
   deweights the RTT measurements during computation of a position fix for the MS, if the at least one classification group indicates that the RTT variability is high.

14. The processor-implemented method of claim 11, wherein the selected positioning method:
   increases a number of RSSI measurements during positioning operations, if the at least one classification group indicates that the RSSI variability is moderate; and
   deweights the RSSI measurements during computation of a position fix for the MS, if the at least one classification group indicates that the RSSI variability is high.

15. An apparatus comprising:
   a communications interface to communicate with a wireless network and receive information pertaining to at least one of measured Round Trip Time (RTT) parameter values associated with a Mobile Station (MS), or measured Received Signal Strength Indicator (RSSI) parameter values associated with the MS;
   a processor coupled to the communications interface, wherein the processor is configured to:
      determine at least one of a RTT variability of the RTT parameter, or a RSSI variability of the RSSI parameter from the received information; and
      classify the MS into at least one classification group of a plurality of classification groups, wherein the at least one classification group is based on at least one of the RTT variability or the RSSI variability.

16. The apparatus of claim 15, wherein:
   the communications interface further to receive information pertaining to at least one of: a number of antennas on the MS, or a power savings mode of the MS; and
   when information pertaining to the number of antennas on the MS is received, the processor is further configured to calculate a time bias associated with the MS using the information pertaining to the number of antennas on the MS.

17. The apparatus of claim 16, wherein the processor is further configured to use the at least one classification group of the MS, and at least one of: the time bias or the power savings mode to determine a position fix of the MS.

18. The apparatus of claim 16, wherein the apparatus further comprises:
   a memory comprising a mobile station characterization database;
   the communications interface further to receive a Media Access Control (MAC) address of the MS; and
   the processor is further configured to store the received MAC address of the MS, the at least one of classification group of the MS, and at least one of: the RSSI variability, the RTT variability, the number of antennas on the MS, the time bias associated with the MS, or the power savings mode of the MS in a record of the characterization database.

19. The apparatus of claim 15, wherein:
   the RTT variability and RSSI variability are determined by a RTT standard deviation based on the RTT parameter values and a RSSI standard deviation based on the RSSI parameter values, respectively; and
   the at least one classification group of MS is based, in part, on at least one of the RTT standard deviation, or the RSSI standard deviation.

20. The apparatus of claim 16, wherein the time bias is a delay between the first and last antenna transmission.

21. The apparatus of claim 18 wherein the processor is further configured to:
   query the characterization database using the MAC address of the MS to retrieve the record in the characterization database with information pertaining to at least one of: the at least one classification group of the MS, the time bias of the MS, or the power savings mode of the MS, wherein the query occurs when the MS reconnects to the wireless network at a subsequent time; and
   determine a position fix for the MS using information in the retrieved characterization database record.

22. The apparatus of claim 15, wherein the wireless network is a Wireless Local Area Network (WLAN) and the communications interface communicates with the WLAN using standard IEE 802.11 frames.

23. An apparatus for performing mobile station positioning operations comprising:
   a memory to store a mobile station characterization database comprising a Media Access Control (MAC) address of a Mobile Station (MS), wherein the MAC address is associated with at least one classification group, the at least one classification group being based on at least one of: a value of a Round Trip Time (RTT) variability associated with the MS, or a value of a Received Signal Strength Indicator (RSSI) variability associated with the MS;
   a communications interface to communicate with the MS over a wireless network; and
   a processor coupled to the memory and the communications interface, the processor to perform positioning operations based, in part, on the at least one classification group of the MS.

24. The apparatus of claim 23, wherein the processor is further configured to use information about a power savings mode of the MS to schedule measurement requests related to the positioning operations during MS wake periods.

25. The apparatus of claim 23, wherein the processor is further configured to:
   cause an increase in a number of RTT measurements taken during positioning, if the at least one classification group indicates that the RTT variability is moderate; and
   deweight the RTT measurements during computation of a position fix for the MS, if the at least one classification group indicates that the RTT variability is high.

26. The apparatus of claim 23, wherein the processor is further configured to:
   cause an increase in a number of RSSI measurements acquired during positioning, if the at least one classification group indicates that the RSSI variability is moderate; and
   deweight the RSSI measurements during computation of a position fix for the MS, if the at least one classification group indicates that the RSSI variability is high.

27. An apparatus comprising:
   means for communicating with a wireless network, the means for communicating to receive information pertaining to at least one of: measured Round Trip Time (RTT) parameter values associated with a Mobile Station (MS), or measured Received Signal Strength Indicator (RSSI) parameter values associated with the MS;
   processing means coupled to the means for communicating, the processing means further comprising:

means for determining at least one of a variability of the Round Trip Time (RTT) parameter, or a variability of the Received Signal Strength Indicator (RSSI) parameter from the received information; and means for classifying the MS into at least one classification group of a plurality of classification groups, wherein the at least one classification group is based on at least one of the RTT variability or the RSSI variability.

28. The apparatus of claim 27, wherein:
the means for communicating further comprises means for receiving information pertaining to at least one of: a number of antennas on the MS, or a power savings mode of the MS; and
when information pertaining to the number of antennas on the MS is received, the processing means further comprises means for calculating a time bias associated with the MS using the information pertaining to the number of antennas on the MS.

29. The apparatus of claim 28, wherein the processing means further comprises means to use the at least one classification group of the MS, and at least one of: the time bias or the power savings mode to determine a position fix of the MS.

30. The apparatus of claim 28, wherein the apparatus further comprises:
means for storing a mobile station characterization database;
the means for communicating further to receive a Media Access Control (MAC) address of the MS; and
the processing means further comprising means for storing the received MAC address of the MS, the at least one of classification group of the MS, and at least one of: the RSSI variability, the RTT variability, the number of antennas on the MS, the time bias associated with the MS, or the power savings mode of the MS in a record of the characterization database.

31. The apparatus of claim 27, wherein:
the RTT variability and RSSI variability are determined by a RTT standard deviation based on the RTT parameter values and a RSSI standard deviation based on the RSSI parameter values, respectively; and
the at least one classification group of MS is based, in part, on at least one of the RTT standard deviation, or the RSSI standard deviation.

32. The apparatus of claim 28, wherein the time bias is a delay between the first and last antenna transmission.

33. The apparatus of claim 30, wherein the processing means further comprises:
means for querying the characterization database using the MAC address of the MS to retrieve the record in the characterization database with information pertaining to at least one of: the at least one classification group of the MS, the time bias of the MS, or power savings mode of the MS, the query occurring when the MS reconnects to the wireless network at a subsequent time; and
means for determining a position fix for the MS using information in the retrieved characterization database record.

34. The apparatus of claim 27, wherein the wireless network is a Wireless Local Area Network (WLAN) and the means for communicating uses standard IEE 802.11 frames to communicate with the WLAN.

35. An apparatus for performing mobile station positioning operations comprising:
means for storing a mobile station characterization database comprising a Media Access Control (MAC) address of a Mobile Station (MS), wherein the MAC address is associated with at least one classification group, the at least one classification group being based at least one of a value of a Round Trip Time (RTT) variability associated with the MS, or a value of a Received Signal Strength Indicator (RSSI) variability associated with the MS;
means for communicating with the MS over a wireless network; and
processing means coupled to the means for storing and the means for communicating, the processing means further comprising means for performing positioning operations based, in part, on the at least one classification group of the MS.

36. The apparatus of claim 35, wherein the processing means further comprises means for scheduling measurement requests related to the positioning operations during MS wake periods based, in part, on information about a power savings mode of the MS.

37. The apparatus of claim 35, wherein the processing means further comprises:
means to cause an increase in a number of RTT measurements taken during positioning, if the at least one classification group indicates that the RTT variability is moderate; and
means to deweight the RTT measurements during computation of a position fix for the MS, if the at least one classification group indicates that the RTT variability is high.

38. The apparatus of claim 35, wherein the processing means further comprises:
means to cause an increase in a number of RSSI measurements acquired during positioning, if the at least one classification group indicates that the RSSI variability is moderate; and
means to deweight the RSSI measurements during computation of a position fix for the MS, if the at least one classification group indicates that the RSSI variability is high.

39. A non-transitory computer readable medium for dynamically characterizing a mobile station (MS) in a wireless network, the computer readable medium storing instructions executable by at least one processor to:
determine at least one of: a Round Trip Time (RTT) variability of measured RTT parameter values associated with the MS, or a Received Signal Strength Indicator (RSSI) variability of measured RSSI parameter values associated with the MS; and
classify the MS into at least one classification group of a plurality of classification groups, wherein the at least one classification group is based on at least one of the RTT variability or the RSSI variability.

40. The computer readable medium of claim 39, further comprising instructions executable by the at least one processor to:
calculate a time bias associated with the MS from information pertaining to a number of antennas on the MS; or
obtain information pertaining to a current power savings mode of the MS.

41. The computer readable medium of claim 40, further comprising instructions executable by the at least one processor to:
provide the at least one classification group of the MS, and at least one of: the time bias, or current power savings mode to a positioning engine to determine a position fix of the MS.

42. The computer readable medium of claim 40, further comprising instructions executable by the at least one processor to:
  obtain a Media Access Control (MAC) address of the MS; and
  store the MAC address of the MS, the at least one of classification group of the MS, and at least one of: the RSSI variability, the RTT variability, the number of antennas on the MS, the time bias associated with the MS, or the current power savings mode of the MS in a record of a database coupled to the wireless network.

43. The computer readable medium of claim 39, wherein:
  the RTT variability and RSSI variability are determined by a RTT standard deviation based on the RTT parameter values and a RSSI standard deviation based on the RSSI parameter values, respectively; and
  the at least one classification group of MS is based, in part, on at least one of: the RTT standard deviation, or the RSSI standard deviation.

44. The computer readable medium of claim 40, wherein the time bias is a delay between the first and last antenna transmission.

45. The computer readable medium of claim 43, further comprising instructions executable by the at least one processor to:
  query the database with the MAC address of the MS to obtain information pertaining to at least one of: the at least one classification group of the MS, the time bias of the MS, a stored power savings mode of the MS, wherein the query occurs when the MS reconnects to the wireless network at a subsequent time; and
  provide the information obtained in response to the query to a positioning engine to determine a position fix for the MS.

46. The computer readable medium of claim 39, wherein the wireless network is a Wireless Local Area Network (WLAN) and the dynamic characterization is performed using standard IEE 802.11 frames.

47. The computer readable medium of claim 40, wherein the current power savings mode comprises one of: Constantly Awake (CAM) mode, Power Save Mode (PSM), Unscheduled Automatic Power Save Delivery (U-APSD), WMM Power Save (WMM-PS), Power Save Multi-Poll (PSMP), or Dynamic MIMO Power Save.

48. The computer readable medium of claim 39, wherein the method is performed by a server coupled to the wireless network.

49. A non-transitory computer readable medium for mobile station positioning over a wireless network, the computer readable medium storing instructions executable by at least one processor to:
  obtain at least one classification group associated with a mobile station (MS), wherein the at least one classification group is based on at least one of a value of a Round Trip Time (RTT) variability associated with the MS, or a value of a Received Signal Strength Indicator (RSSI) variability associated with the MS; and
  select a positioning method based, in part, on the at least one classification group of the MS.

50. The computer readable medium of claim 49, further comprising instructions executable by the at least one processor to:
  obtain information about a current power savings mode of the MS to schedule measurement requests related to the positioning during MS wake periods.

51. The computer readable medium of claim 49, wherein the selected positioning method further comprises instructions executable by the at least one processor to:
  increase a number of RTT measurements for the MS during positioning, if the at least one classification group indicates that the RTT variability is moderate; and
  deweight the RTT measurements during computation of a position fix for the MS, if the at least one classification group indicates that the RTT variability is high.

52. The computer readable medium of claim 49, wherein the selected positioning method further comprises instructions executable by the at least one processor to:
  increase a number of RSSI measurements during positioning, if the at least one classification group indicates that the RSSI variability is moderate; and
  deweight the RSSI measurements during computation of a position fix for the MS, if the at least one classification group indicates that the RSSI variability is high.

* * * * *